June 11, 1929.  G. E. PALMER ET AL  1,716,660
METER ADAPTER
Filed Sept. 15, 1923
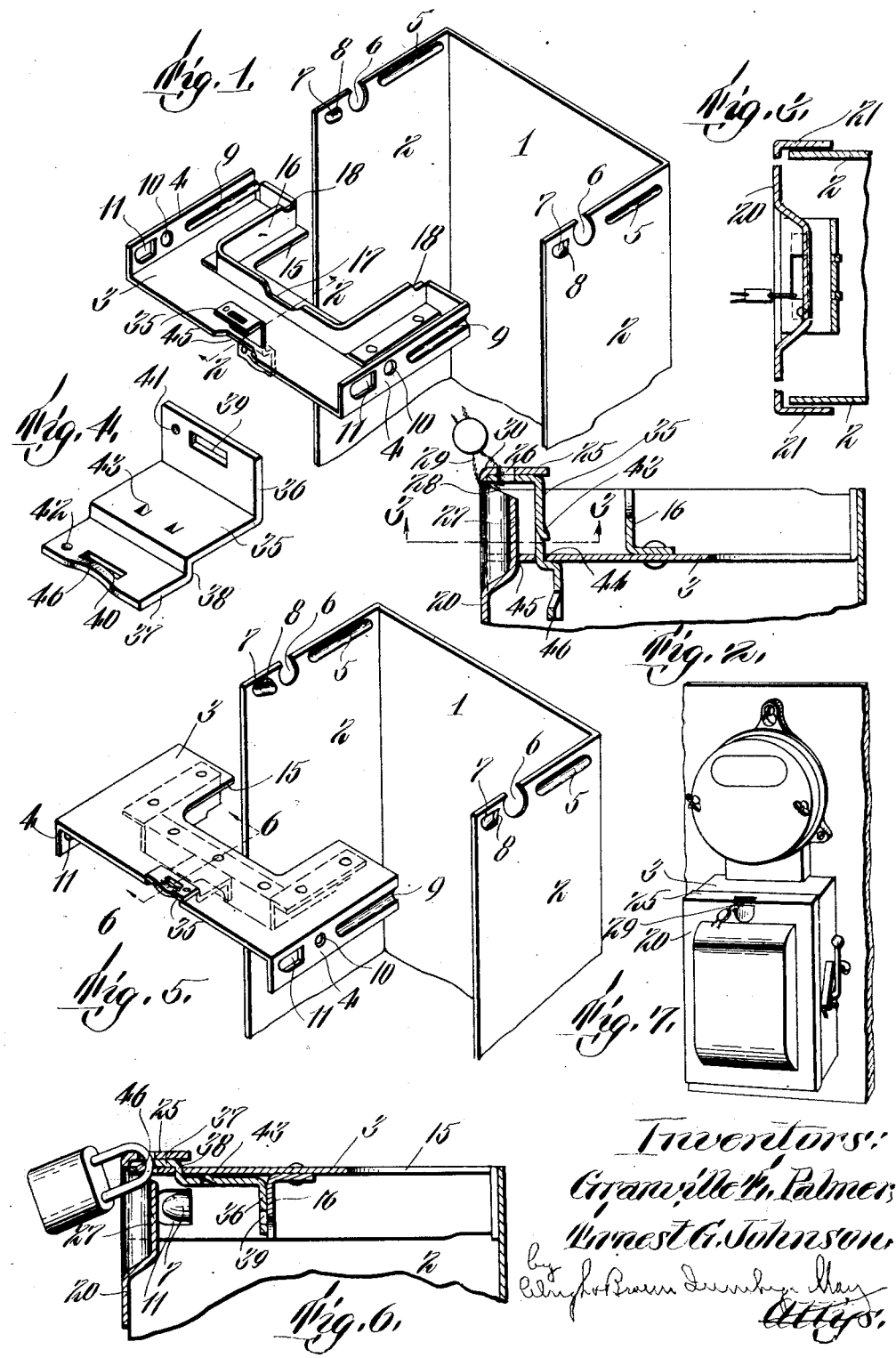

Patented June 11, 1929.

1,716,660

UNITED STATES PATENT OFFICE.

GRANVILLE E. PALMER, OF BROOKLINE, AND ERNEST G. JOHNSON, OF BOSTON, MASSACHUSETTS, ASSIGNORS, BY MESNE ASSIGNMENTS, TO THE PALMER ELECTRIC & MANUFACTURING CO., OF WALTHAM, MASSACHUSETTS, A CORPORATION OF MASSACHUSETTS.

METER ADAPTER.

Application filed September 15, 1923. Serial No. 662,838.

In service installation of meters it is now usual practice to enclose the service switch and protection fuses in a box having an open side facing the meter, this open side being closed off by an adapter plate having an opening shaped to register with the terminal chamber of the meter. As different types of meter have differently shaped terminal chambers, and vary in size, it has heretofore been customary to provide a large number of adapter plates each having an opening shaped to conform to the terminal chamber of a particular type of meter, these various plates being interchangeably associated with the box. At least eleven different forms of adapter plates have heretofore been found necessary to fit the various types of meters now in common use. There has also been developed what is known as a standardized box with which these various adapter plates have been designed to fit.

In our application for patent filed September 15, 1923, Serial No. 662,837, for meter installations, is disclosed and claimed a meter adapter plate which may be used in place of any of the eleven forms of plate heretofore used, this plate being found to fit certain types of meters when assembled in a box or housing one side out and to fit other types of meters when assembled in the box with the other side out.

The object of the present invention is to so construct such a plate that it may be assembled either side out in the standardized box, and the box closed and sealed and the adapter plate also sealed in either of its operative positions.

For a more complete understanding of this invention, reference may be had to the accompanying drawings in which Figure 1 is a fragmentary perspective showing the upper portion of the standardized box with the adapter plate detached.

Figure 2 is a fragmentary section on the plane of line 2—2 of Figure 1, but showing the plate in position in the box and the cover closed and sealed thereto.

Figure 3 is a detail section on line 3—3 of Figure 2.

Figure 4 is a detail of the adapter plate sealing member.

Figure 5 is a view similar to Figure 1, but showing the adapter plate in inverted position.

Figure 6 is a view similar to Figure 2, but showing the plate in the position of Figure 5.

Figure 7 shows in perspective the standardized box and meter in position on a wall or panel.

Referring to Figures 1 and 5 wherein is shown the upper portion of a standardized box, 1 indicates the rear wall or base of the box from which extend forwardly spaced opposed sides 2. The upper side or end of the box between the sides 2 is open for the reception of the adapter plate 3. This adapter plate has a pair of end flanges 4 extending from one side face thereof, these flanges being formed to interfit between the sides 2 at their upper ends. For retaining them in proper position each side 2 is formed with an inwardly extending rib 5 adjacent the rear wall 1, a cutout 6 forwardly of the rib 5, and a short inwardly extending lug 7 formed by striking inwardly the material of the side forwardly from a slit 8 therethrough. The slit 8 causes the rear end of the lug to present an abrupt surface at right angles to the plane of the sides 2. Each flange 4 is formed with an inwardly struck rib 9 complemental to the rib 5, a perforation 10 coming opposite the cutout 6 and a cutout 11 through which the lug 7 may extend, these portions on the flange being formed substantially centrally of its width so that the adapter plate may be sprung between the sides 2, either side out, and properly mate the ribs, lugs and cutouts of the sides of the box. The lugs 7 extending through the cutouts 11 block the adapter plate from being pulled outwardly, their abrupt rear edges engaging the rear walls of the cutouts, and it is only by springing apart the side walls 2 that the adapter plate may be inserted or removed therefrom.

At one side edge of the plate 3 is a cutout as at 15 shaped to fit the terminal chambers of one or more types of meters in the same manner as disclosed in the application for patent hereinbefore referred to. On the same side of the plate as the flanges 4 is positioned a flange 16 arranged about the margin of the cutout 15 and spaced therefrom, this flange, as shown, being provided with a central cut away portion 17 and end cut away portions 18. This flange is of substantially the same contour as the similar flange in the application hereinbefore referred to and is formed to cooperate with other types of meters, the adapter plate being arranged to co-operate with certain types of meters when inserted in a box with one side facing outwardly and with one or more other types of meters with the other side facing outwardly.

The forward face of the standardized box is arranged to be closed by a cover 20 (see Figures 2, 3 and 6) and as shown in Figure 3 this cover is provided with side flanges 21 adapted to overlie the outer edges of the sides 2 so that when the cover is in closed position these sides can not be sprung apart to permit the adapter plate when in position therebetween to be detached therefrom.

As shown also more particularly in Figures 2 and 6, the cover 20 has an end flange 25 which partially bridges the open side of the box when the cover is closed and at the central portion of the width of this flange it is provided with a slot 26 through which a lock such as a padlock, or a wire 29 of a seal, or both, may be passed to secure it in closed position to the forward edge of the adapter plate as heretofore constructed. Immediately below the slot 26 the wall of the cover is pressed inwardly as at 27 and is cut away as at 28 from the flange 25, thus leaving a space through which the hasp of the padlock and sealing wire 29 passing through the slot 26 may be brought out to the front of the box, the hasp and wire being thus attached about an angular portion 30. It will be noted, however, that with the adapter plate of the present construction the main portion 3 of the plate is at either one of a pair of different elevations in the box depending on which side of the adapter plate is turned to face outwardly. For example, in Figure 2 with the flanges 21 and 16 extending outwardly, the plate 3 is considerably below the upper edges of the sides 2 while when the plate is in reversed position, as shown in Figure 6, the plate 3 comes closely adjacent the upper ends of the sides 2 while the flanges 4 and 16 extend inwardly. In order that the plate may be secured to the cover in either of these positions, a sealing member 35 shown detached in Figure 4, has been provided. This member 35 is in the form of a plate having a flange portion 36 extending at right angles thereto at one end and a flange portion 37 substantially parallel to the main portion of the plate 1 and offset therefrom by the width of a connecting portion 38 at the other end. The flanges 36 and 37 are each provided with slots 39 and 40 and in alinement therewith with perforations 21 and 42, and the main portion of the plate has cut and struck therefrom one or more fingers 43.

This plate is inserted through a slot 44 in the adapter plate rearwardly of a portion cut away at 45 to clear the portion 27 of the cover when it is in closed position. The flange portion 36 of the sealing plate is positioned on the same side of the adapter plate as the flanges 4 and 16 and the flange portion 37 on the opposite side of the adapter plate. The fingers 43 limit the extent to which the plate may be pushed through the slot 44 in one direction and a portion of the flange 37 outwardly of the slot 40, as at 46, is bent laterally to prevent the sealing plate from being detached from the adapter plate by movement of the sealing plate relative to the adapter plate in the opposite direction. The fingers 43 and the portion 46 therefore prevent detachment of the sealing plate from the adapter plate after having been once assembled therewith. When the adapter plate is positioned with the flanges 4 and 16 facing outwardly, as in Figures 1 and 2, and the cover 20 is closed, the flange 36 of the sealing plate is arranged to underlie the flange 25 of the cover, the slot 39 and the perforation 41 then coming in alinement with the slot 26 of the cover flange. When the adapter plate is positioned facing in the reverse direction, that is, with the flanges 4 and 16 inwardly directed, as shown in Figures 5 and 6, the sealing plate is rocked relative to the adapter plate so as to bring the flange 36 adjacent the outer edge of the flange 16 and the flange 37 overlying the face of the adapter plate and projecting beneath the cover flange 25. In this position the slot 40 and the perforation 42 of the flange 37 register with the slot 26 of the cover flange 25.

It will thus be seen that in either position of the adapter plate, the sealing plate which is carried thereby, may be so turned as to permit securing the cover to it and that when the cover is closed the sides 2 of the box are prevented from being spread apart to permit the disengagement of the adapter plate, since this plate can not be drawn out by a forward pull in view of the engagement of the rear edges of the lugs 7 with the rear edges of the cutouts 11 of the plate. The slots 39 and 40 and the perforations 41 and 42 are usual constructions, the slots being particularly intended for the passage of the hasp of a padlock and the passages 41 and 42 being intended more particularly for the sealing wire.

The box may be fixed to a vertical wall or panel in the usual manner, as indicated in Figure 7, and the meter is then also supported on the wall or panel in position for its terminal chamber to register properly with the adapter plate.

Having thus described an embodiment of this invention it should be evident to those skilled in the art that various changes and modifications may be made therein without departing from its spirit or scope as defined by the appended claims.

We claim:

1. A device of the class described comprising a box having an open side and a cover, a reversible meter adapter plate for bridging said open side when positioned either side out, and means for adapting said plate and cover to be secured together, when said plate is in either of its bridging positions, said device including means adapting opposite faces of said plate to cooperate with meter terminal chambers of different sizes and shapes to prevent unauthorized access to the interior of said box about said terminal chambers, and said device including means for preventing removal of said plate from said box.

2. A device of the class described comprising a box having an open side, and a cover having a flange partly overlying said open side, of a reversible meter adapter plate for bridging said open side when positioned either side out, and means adapting said plate to be secured to said flange when said cover is closed and said plate is in either of its bridging positions, said device including means adapting opposite faces of said plate to cooperate with meter terminal chambers of different sizes and shapes to prevent unauthorized access to the interior of said box about said terminal chambers, and said device including means for preventing removal of said plate from said box.

3. A device of the class described comprising a box having sides, a cover for closing against the forward edges of said sides, a reversible adapter plate, means adapting said plate to be engageable between said sides at a plurality of different distances from the ends thereof, and a member movably carried by said plate to bring a portion thereof into securing relation to said cover when said cover is closed in all of the engaging positions of said plate, said device including means for preventing removal of said plate from said box.

4. A device of the class described comprising a box having sides, a cover closing against the forward edges of said sides and having an end flange overlying the ends thereof when the cover is closed, a meter adapter plate, means adapting said plate to be engageable between said sides at a plurality of different distances from said end flange, a member movably carried by said plate to bring one of a plurality of portions in close relation to said flange in all engaged positions of said plate, and means for fixing said plate and sides together.

5. A device of the class described comprising a box having a rear wall, oppositely disposed sides projecting from said rear wall, and a cover closing against the forward edges of said sides, a reversible adapter plate having end flanges engageable between said sides at one end thereof, said plate being positioned either side out with its end flanges extending either inwardly or outwardly, a member carried by said plate and movable relatively thereto to present portions into securing relation to said cover when said cover is closed, said plate being positioned either side out, and means for preventing movement of said plate relative to said sides.

6. In combination with a box having a rear wall, oppositely disposed sides extending from said rear wall, and a cover having side flanges overlying said sides when the cover is closed and preventing said sides from being sprung apart, of a reversible adapter plate having end flanges fitting between said sides with said plate positioned either side out and presenting said end flanges either inwardly or outwardly, said sides and end flanges being provided with complemental means permitting the insertion or removal of said plate only when said sides are sprung apart, and means whereby said plate may be secured to said cover when said cover is in closed position, said plate being either side out, whereby said cover may not be opened nor said plate removed while said cover is secured.

7. In combination with a box having opposed sides, a cover for closing against the forward edges of said sides and having an end flange overlying the ends thereof when the cover is closed, of a reversible adapter plate having end flanges projecting from one face thereof engageable between said sides with said flanges extending either inwardly or outwardly of said box, whereby said plate may be positioned either side out at either of two distances from said cover end flange, a member carried by said plate and having two portions, one of which portions may be positioned closely adjacent to said cover flange when said adapter plate is positioned at one of said distances, and the other of which may be positioned closely adjacent to said cover flange when said cover plate is positioned at the other of said distances, said portions and said cover flange having means adapting them to be secured together, and means for fixing said flanges to said sides.

In testimony whereof we have affixed our signatures.

GRANVILLE E. PALMER.
ERNEST G. JOHNSON.